(12) United States Patent
Okamine et al.

(10) Patent No.: US 11,570,746 B2
(45) Date of Patent: Jan. 31, 2023

(54) CHECK-IN DETERMINATION DEVICE

(71) Applicant: NTT DOCOMO, INC., Chiyoda-ku (JP)

(72) Inventors: Tadashi Okamine, Chiyoda-ku (JP); Kazuya Sasaki, Chiyoda-ku (JP); Shoichi Horiguchi, Chiyoda-ku (JP); Masatoshi Kimoto, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 0 days.

(21) Appl. No.: 17/281,854

(22) PCT Filed: Jul. 22, 2019

(86) PCT No.: PCT/JP2019/028709
§ 371 (c)(1),
(2) Date: Mar. 31, 2021

(87) PCT Pub. No.: WO2020/075364
PCT Pub. Date: Apr. 16, 2020

(65) Prior Publication Data
US 2022/0022157 A1 Jan. 20, 2022

(30) Foreign Application Priority Data
Oct. 11, 2018 (JP) .............................. JP2018-192607

(51) Int. Cl.
*H04W 64/00* (2009.01)
*H04W 4/029* (2018.01)
*H04W 4/021* (2018.01)
(52) U.S. Cl.
CPC ......... *H04W 64/006* (2013.01); *H04W 4/022* (2013.01); *H04W 4/029* (2018.02)

(58) Field of Classification Search
CPC ....... H04W 4/021; H04W 4/029; H04W 4/02; H04W 88/02; H04W 12/63; H04W 12/61;
(Continued)

(56) References Cited

U.S. PATENT DOCUMENTS 8,755,824 B1 * 6/2014 Wang .................. G06F 16/9537
455/456.3
9,706,355 B1 * 7/2017 Cali ..................... H04W 68/005
(Continued)

FOREIGN PATENT DOCUMENTS

JP 2008-310620 A 12/2008
JP 2010-262484 A 11/2010
(Continued)

OTHER PUBLICATIONS

International Search Report dated Oct. 21, 2019 in PCT/JP2019/028709 filed on Jul. 22, 2019, 2 pages.
(Continued)

*Primary Examiner* — Kwasi Karikari
(74) *Attorney, Agent, or Firm* — Oblon, McClelland, Maier & Neustadt, L.L.P.

(57) ABSTRACT

A check-in determination apparatus 1 includes: a determination history information storage unit 13 configured to store determination history information for each terminal 2, in which position identifying information capable of identifying a position of the terminal 2 when check-in of the terminal 2 with respect to the geofence was determined is correlated with geofence identifying information capable of identifying the geofence; a related geofence information storage unit 12 configured to store related geofence information that correlates another geofence with each geofence; a position identifying information acquisition unit 14 configured to acquire position identifying information of the terminal 2; and a check-in determination unit 15 configured (Continued)

to determine check-in of the terminal 2 with respect to the geofence determined on the basis of the acquired position identifying information of the terminal 2, the stored determination history information, and the stored related geofence information.

5 Claims, 10 Drawing Sheets

(58) Field of Classification Search
CPC ..... H04W 12/64; H04W 4/023; H04W 4/025; H04W 84/12; H04W 12/104; H04W 4/23; H04W 4/30; H04W 64/00; H04W 4/38; G06Q 30/0261; G06Q 30/0267; G06Q 50/01; G06Q 30/0205; G06Q 30/0201; G06Q 30/0241; G06Q 30/0641; G06Q 20/3224; G06Q 30/02; G06Q 30/0259; G06Q 30/0255
See application file for complete search history.

(56) References Cited

U.S. PATENT DOCUMENTS

| | | | |
|---|---|---|---|
| 9,774,993 B1* | 9/2017 | DeLuca | G06F 16/9535 |
| 2013/0275221 A1* | 10/2013 | Zeto, III | G06Q 30/0261 |
| | | | 705/14.58 |
| 2017/0045364 A1* | 2/2017 | Trivedi | G01C 21/3476 |

FOREIGN PATENT DOCUMENTS

| | | |
|---|---|---|
| JP | 2012-243067 A | 12/2012 |
| JP | 2017-84411 A | 5/2017 |

OTHER PUBLICATIONS

International Preliminary Report on Patentability and Written Opinion dated Apr. 22, 2021 in PCT/JP2019/028709 (submitting English language translation only), 14 pages.

* cited by examiner

Fig.4

| POINT NAME | Lat | Lon | RADIUS |
|---|---|---|---|
| 0 | 35.67160100466009 | 139.74065636676073 | 50 |
| 1 | 35.6708913682185 | 139.73963190416305 | 80 |
| ⋮ | ⋮ | ⋮ | ⋮ |

Fig.6

| POINT NAME | Lat | Lon | RADIUS | PRESCRIBED RANGE (~200m) | PRESCRIBED RANGE (200m~500m) | PRESCRIBED RANGE (500m~1km) |
|---|---|---|---|---|---|---|
| 0 | 35.67160100466009 | 139.74065636676073 | 50 | 1, 2, 3, 4 | 5, 6, 7, 8, 9, A | B, C, D, E, F, G, H, I |
| 1 | 35.6708913682185 | 139.73963190416305 | 80 | 0, ... | ... | ... |
| ... | ... | ... | ... | ... | ... | ... |

*Fig.8*

| UUID | Lat | Lon | datetime | POINT NAME |
|---|---|---|---|---|
| 123456 | 35.6713358774017 | 139.7403721938 5116 | 2018-08-22 13:40:00 | 0 |
| ... | ... | ... | ... | ... |

CHECK-IN DETERMINATION DEVICE

TECHNICAL FIELD

An aspect of the present disclosure relates to a check-in determination apparatus that determines check-in indicating that a terminal has entered a geofence which is a prescribed geographic area.

BACKGROUND ART

Patent Literature 1 as below discloses a geofence management system that determines that a user device has entered a boundary of a geofence including a related point of interest.

CITATION LIST

Patent Literature

[Patent Literature 1] Japanese Unexamined Patent Publication No. 2017-84411

SUMMARY OF INVENTION

Technical Problem

Generally, an apparatus that determines check-in of a terminal into geofences determines check-in of a terminal for each of all geofences registered in advance. Therefore, there is a problem that it takes a considerable amount of time in determining check-in of a terminal if there are many geofences registered in advance.

Therefore, an aspect of the present disclosure has been made in view of these problems, and an object thereof is to provide a check-in determination apparatus capable of determining check-in at a higher speed.

Solution to Problem

In order to solve the problems, a check-in determination apparatus according to an aspect of the present disclosure is a check-in determination apparatus configured to determine check-in indicating that a terminal has entered a geofence which is a prescribed geographic area, including: a determination history information storage unit configured to store determination history information for each terminal, in which position identifying information capable of identifying a position of the terminal when check-in of the terminal with respect to the geofence was determined is correlated with geofence identifying information capable of identifying the geofence; a related geofence information storage unit configured to store related geofence information configured to correlate another geofence with each geofence on the basis of a distance from the geofence; a position identifying information acquisition unit configured to acquire position identifying information of the terminal; and a check-in determination unit configured to determine check-in of the terminal with respect to a target geofence which is the geofence determined on the basis of the position identifying information of the terminal acquired by the position identifying information acquisition unit, the determination history information stored by the determination history information storage unit, and the related geofence information stored by the related geofence information storage unit.

According to such a check-in determination apparatus, check-in of a terminal with respect to the determined target geofence is determined. For example, since narrowed-down geofences are determined as the target geofence and the number of target geofences for which check-in of the terminal is determined decreases, it is possible to determine check-in at a higher speed.

Advantageous Effects of Invention

According to an aspect of the present disclosure, it is possible to determine check-in at a higher speed.

BRIEF DESCRIPTION OF DRAWINGS

FIG. 2 is a diagram for describing check-in.

FIG. 4 is a diagram illustrating an example of a geofence information table.

FIG. 6 is a diagram illustrating an example of a related geofence information table.

FIG. 8 is a diagram illustrating an example of determination history information table.

DESCRIPTION OF EMBODIMENTS

Hereinafter, an embodiment of a check-in determination apparatus will be described in detail with reference to the accompanying drawings. In description with reference to the drawings, the same elements will be referred to by the same reference signs and redundant description thereof will be omitted. In the following description, the embodiments are specific examples of the present invention, and the present invention is not limited to these embodiments unless particularly stated otherwise.

Figure 1:
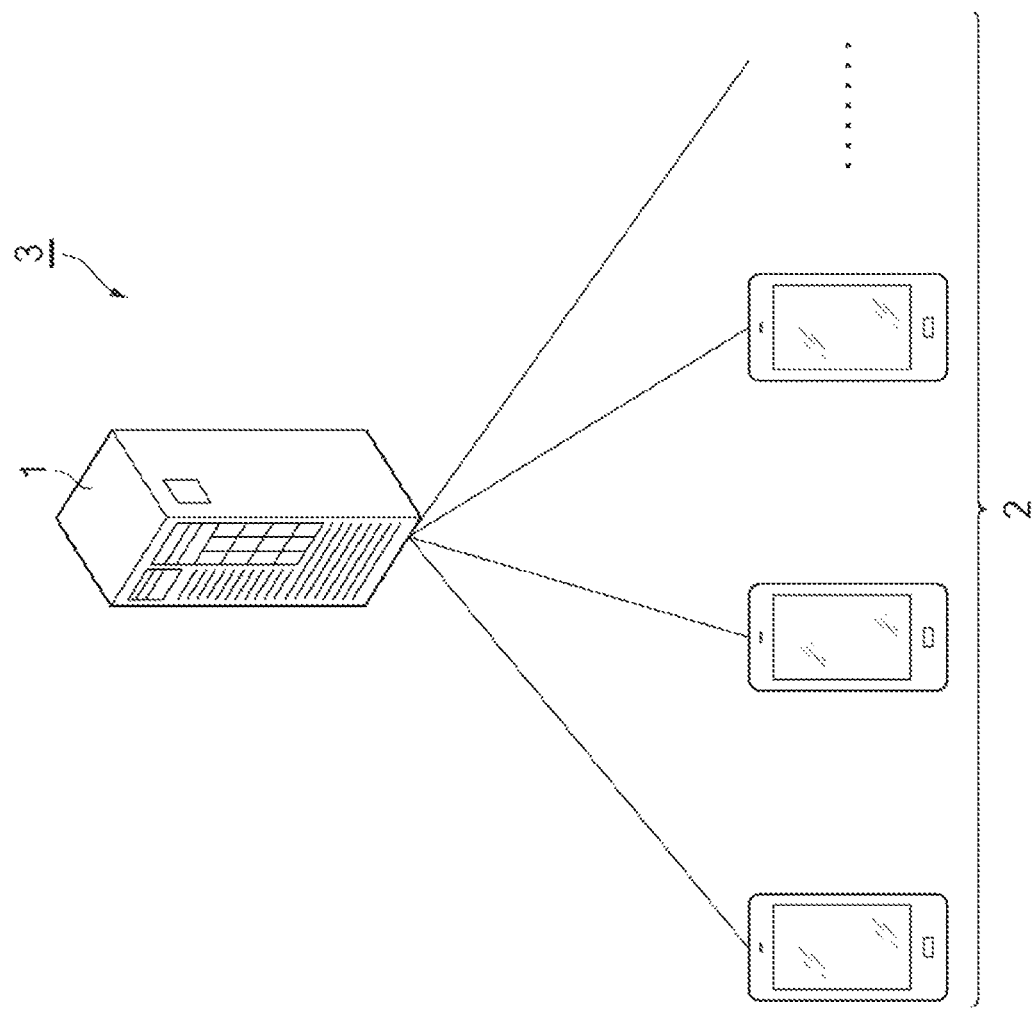
FIG. 1 is a conceptual diagram of a check-in determination system according to an embodiment of the present invention.

FIG. 1 is a conceptual diagram of a check-in determination system 3. As illustrated in FIG. 1, the check-in determination system 3 includes a check-in determination apparatus 1 and one or more terminals 2. The check-in determination apparatus 1 and the terminals 2 are connected by a network such as a mobile communication network or a wireless local area network (LAN) so as to be accessible to each other.

The check-in determination apparatus 1 is a computer apparatus such as a server. The check-in determination apparatus 1 determines check-in indicating that the terminal 2 has entered a geofence which is a prescribed geographic area. The details of the functions of the check-in determination apparatus 1 will be described later.

Specifically, a geofence is a virtual geographic boundary or region (area) set in a real-world arbitrary position. In the present embodiment, although a geofence is represented as a circle defined by the center indicated by a latitude and a longitude and a radius indicated by a distance, there is no limitation thereto. For example, a geofence may be a geographic area surrounded by arbitrary curves and/or lines. Moreover, for example, a geofence is not limited to a 2-dimensional space and may be a range spreading in a 3-dimensional space such as a sphere or a solid.

Specifically, check-in indicates that the terminal 2 has crossed a geographic boundary of a geofence or the terminal 2 has entered the region of a geofence. Checking-in indicates that the terminal 2 crosses a geographic boundary of a geofence or the terminal 2 enters the region of a geofence. Determining check-in means determining whether the terminal 2 has checked in (entered) a geofence or determining that the terminal 2 has checked in (entered) a geofence. An example of the use of the determination of check-in is a purchase inducing mechanism in which a geofence is set in advance around a certain store, and when it is determined that the terminal 2 carried by a user has checked into the geofence (that is, has approached the store), a coupon for the store is distributed to the terminal 2, and the user looks at the distributed coupon and visits the store with an increased buying intention.

Figure 2:
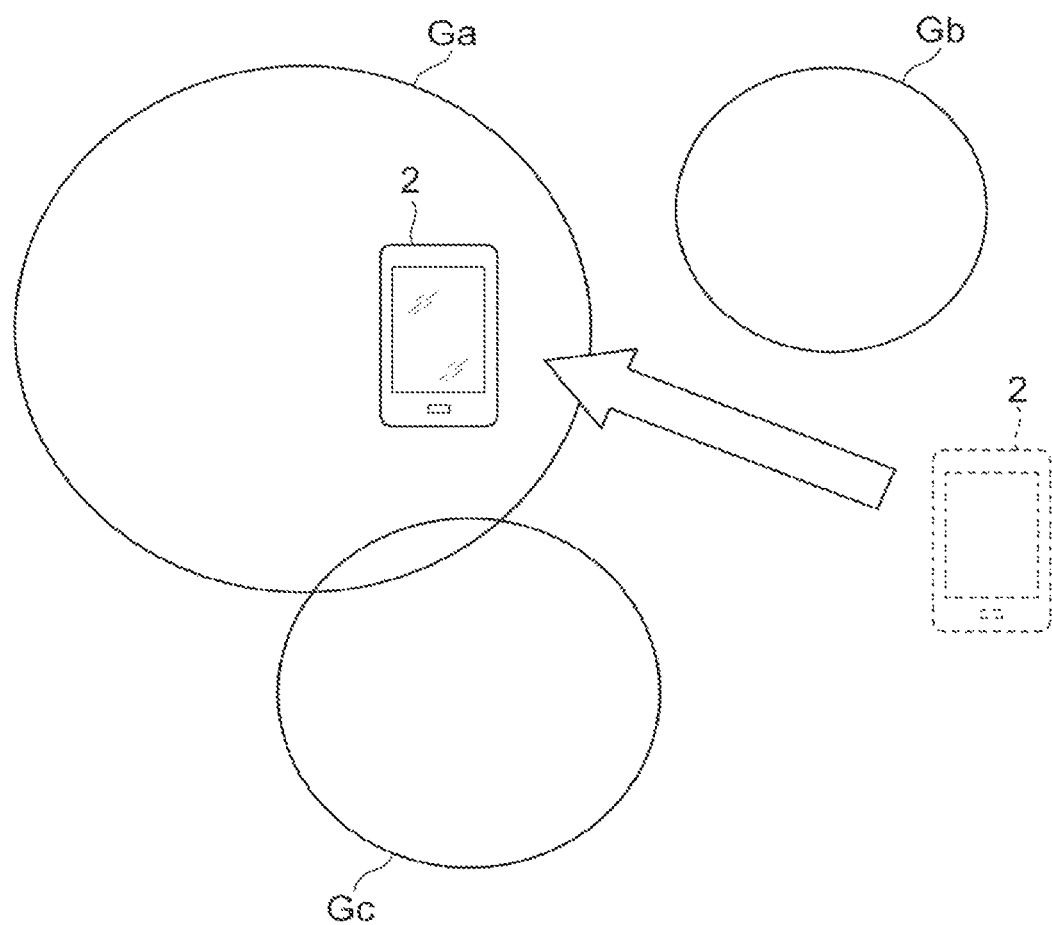

FIG. 2 is a diagram for describing check-in. As illustrated in FIG. 2, three geofences Ga, Gb, and Gc are formed in advance. FIG. 2 illustrates a scene in which the terminal 2 moves into the geofence Ga and the terminal 2 checks into the geofence Ga. The terminal 2 may check into a plurality of geofences at a time. For example, in FIG. 2, when the terminal 2 has moved to an overlapping range of the geofences Ga and Gc, the terminal 2 checks into the geofences Ga and Gc.

The terminal 2 is a computer apparatus such as a smartphone. The terminal 2 may be carried by a user and may be provided in a machine or an apparatus such as an automobile. Although it is assumed that the terminal 2 moves geographically, there is no limitation thereto.

The terminal 2 transmits position identifying information capable of identifying the position of the terminal 2 to the check-in determination apparatus 1 (specifically, a position identifying information acquisition unit 14 thereof to be described later). The transmission timing may be periodical (for example, once a minute) and may be an arbitrary timing based on an instruction or the like of the user or the check-in determination apparatus 1. Specifically, the position identifying information is Lat (Latitude) and Lon (Longitude) which are the latitude and longitude acquired by a global positioning system (GPS) included in the terminal 2 or a service set identifier (SSID) or a basic service set identifier (BSSID) related to a network that the terminal 2 is accessing. However, there is no limitation thereto, and arbitrary information may be used as long as it can identify the position of the terminal 2. Although the position of the terminal 2 based on SSID or BSSID can be identified on the basis of the position information (latitude and longitude and the like) registered in advance of a network relay apparatus such as an access point indicated by the SSID or the BSSID, there is no limitation thereto. Hereinafter, in the present embodiment, although the position identifying information is described as the latitude and longitude, the position identifying information may be appropriately replaced with SSID or BSSID or another information capable of identifying the position. Furthermore, the position identifying information may include a universally unique identifier (UUID) which is identification information of the terminal 2 and datetime (date and time) indicating the timing at which the position identifying information was acquired.

The terminal 2 may receive a determination result of the check-in determination apparatus 1 or information based on the determination result from the check-in determination apparatus 1 or another apparatus connected via the network and display the same to a user. For example, the terminal 2 may receive and display information indicating that it has checked into a certain geofence or coupon information or the like related to a coupon of a store when it is determined that the terminal 2 has checked into a geofence formed by the store.

Figure 3:
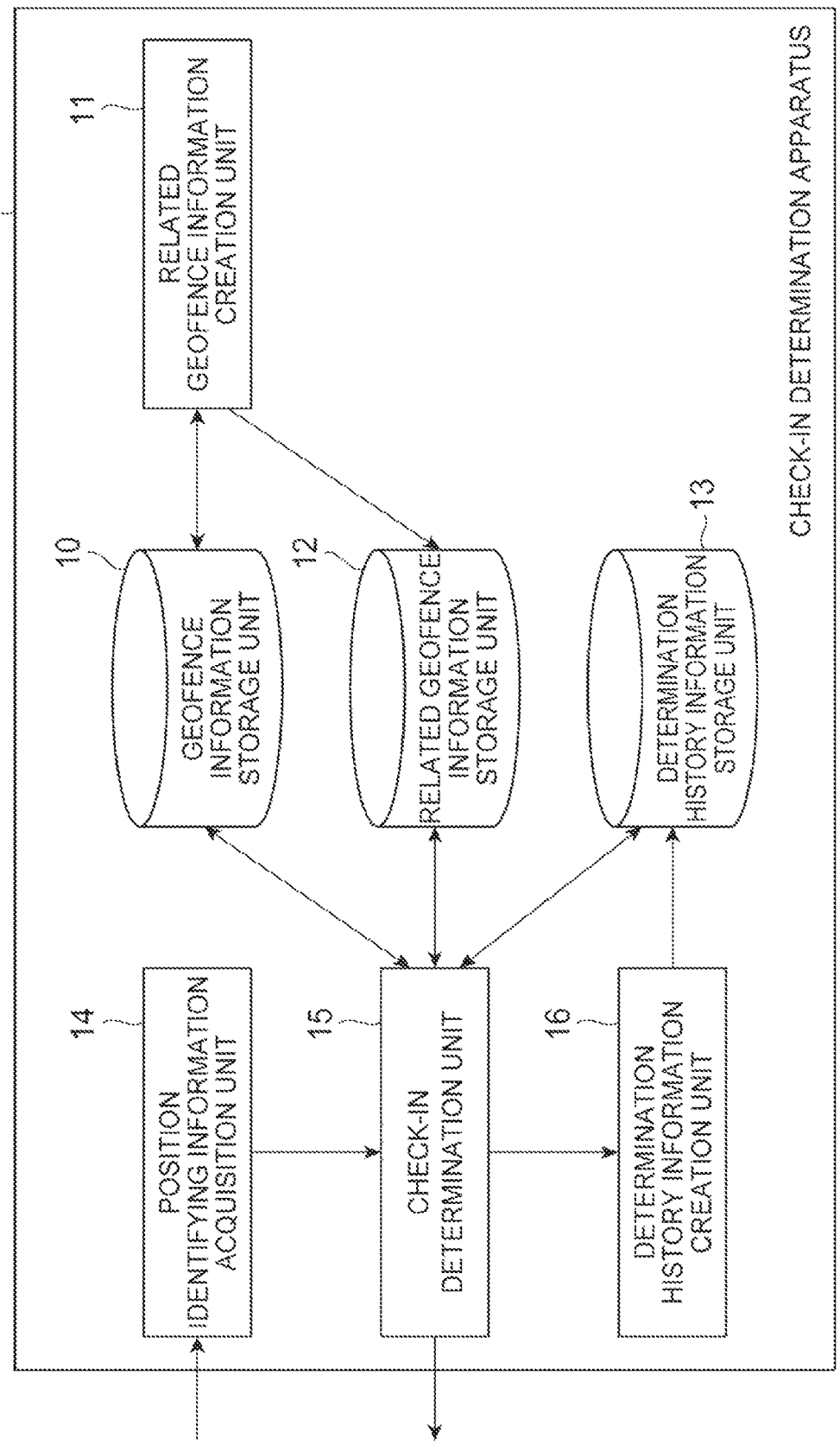
FIG. 3 is a functional block diagram of a check-in determination apparatus according to an embodiment of the present invention.

FIG. 3 is a functional block diagram of the check-in determination apparatus 1. As illustrated in FIG. 3, the check-in determination apparatus 1 includes a geofence information storage unit 10, a related geofence information creation unit 11 (a related geofence information creation unit), a related geofence information storage unit 12 (a related geofence information storage unit), a determination history information storage unit 13 (a determination history information storage unit), a position identifying information acquisition unit 14 (a position identifying information acquisition unit), a check-in determination unit 15 (a check-in determination unit), and a determination history information creation unit 16 (a determination history information creation unit). Hereinafter, the respective functional blocks of the check-in determination apparatus 1 illustrated in FIG. 3 will be described.

The geofence information storage unit 10 stores geofence information which is information related to a geofence. Specifically, the geofence information is information that defines a geofence. FIG. 4 is a diagram illustrating an example of a geofence information table. As illustrated in FIG. 4, the geofence information is correlated with a point name which is the name for identifying a geofence, Lat which is the latitude of the center of the geofence, Lon which is the longitude of the center of the geofence, and the radius of the geofence. For example, the first record of the example of the geofence information table illustrated in FIG. 4 indicates that the point name of the geofence is "0", the latitude and longitude of the center of the geofence are "35.67160100466009" and "139.74065636676073", respectively, and the radius of the geofence is "50" meters. The geofence information may include a portion of the point name, Lat, Lon, and the radius and may include other information in correlation. The geofence information may be created in advance by an administrator or the like of the check-in determination apparatus 1, and a computer apparatus may create the same mechanically on the basis of the information related to the existing geofences.

Figure 5:
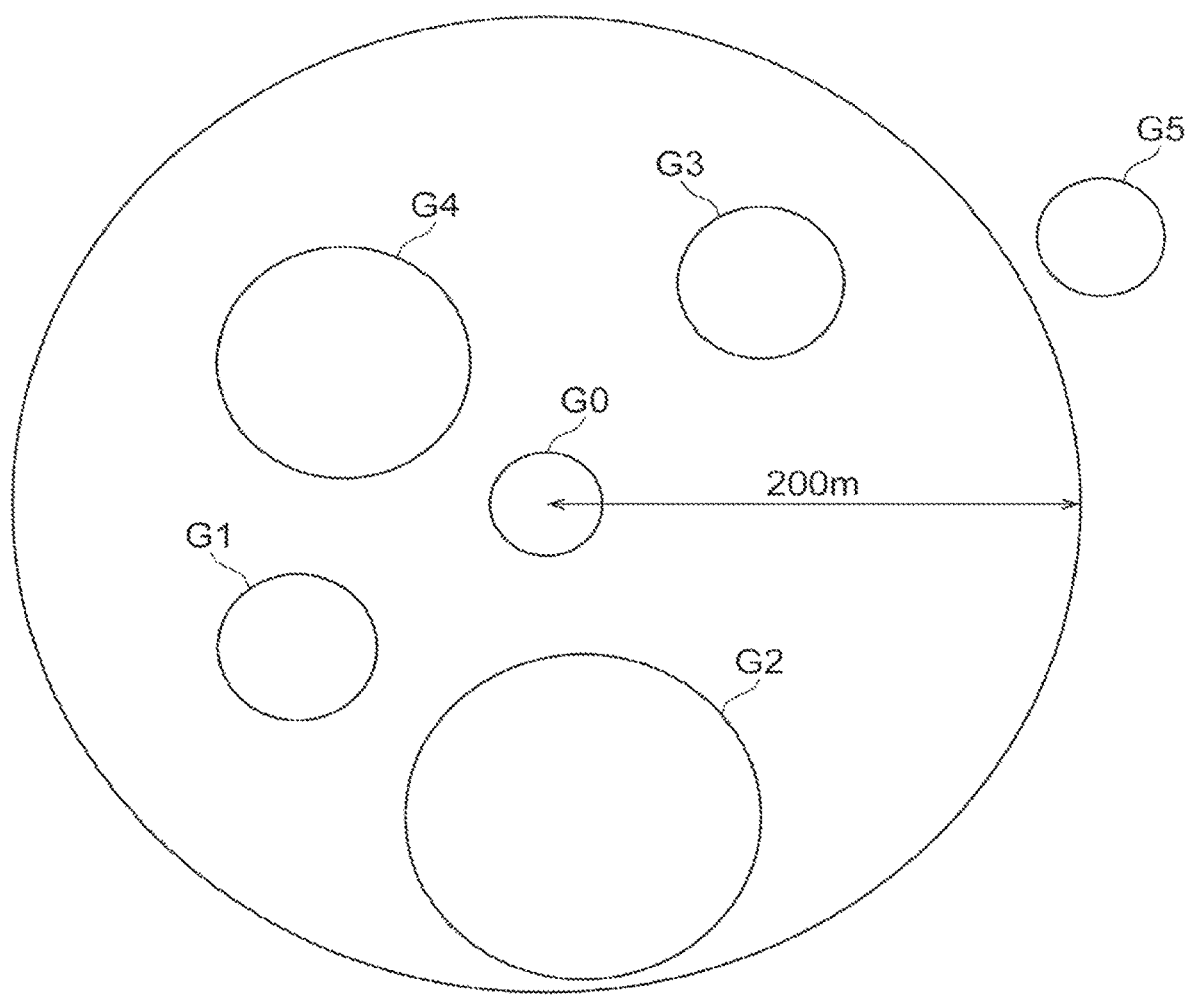
FIG. 5 is a diagram for describing correlations between pieces of related geofence information.

The related geofence information creation unit 11 creates related geofence information for each geofence, correlated with other geofences on the basis of the distances from respective geofences on the basis of the geofence information stored by the geofence information storage unit 10. FIG. 5 is a diagram for describing correlations between pieces of related geofence information. As illustrated in FIG. 5, six geofences G0 to G5 are formed in advance. FIG. 5 illustrates a scene in which related geofence information is created such that geofences G1 to G4 (other geofences) which are geofences other than the geofence G0 at a distance equal to or smaller than the radius of 200 meters (a prescribed value to be described later) from the center of the geofence G0 are correlated with the geofence G0. Since the geofence G5 is not at a distance equal to or smaller than the radius of 200 meters from the center of the geofence G0, the geofence G5 is not correlated in the related geofence information. The condition "at a distance equal to or smaller than the radius of 200 meters from the center" is not limited thereto, and an arbitrary condition on the basis of a distance may be used. For example, a condition "within a donut-shaped range at a distance larger than the radius of 200 meters and equal to or smaller than the radius of 500 meters from the center" may be used. The condition may be set in advance arbitrarily by an administrator or the like of the check-in determination apparatus 1.

FIG. 6 is a diagram illustrating an example of a related geofence information table. As illustrated in FIG. 6, the related geofence information is correlated with a point name which is the name for identifying a geofence, Lat which is the latitude of the center of the geofence, Lon which is the longitude of the center of the geofence, the radius of the geofence, a point name of a geofence (another geofence) included in a prescribed range (hereinafter a prescribed range of "~200 in") which is a range in which the radius from the center is equal to or smaller than 200 meters, a point name of a geofence (another geofence) included in a prescribed range (hereinafter a prescribed range of "200 m ~500 m") which is a range in which the radius from the center is larger than 200 meters and equal to or smaller than 500 meters, and a point name of a geofence (another geofence) included in a prescribed range (hereinafter a prescribed range of "500 m~1 km") which is a range in which the radius from the center is larger than 500 meters and equal to or smaller than 1 kilometers. Although the prescribed range is based on the distance from the center of a geofence, there is no limitation thereto, and the prescribed range may be based on the distance from an arbitrary point in a geofence.

For example, the first record of the example of the related geofence information table illustrated in FIG. 6 indicates that a geofence of which the point name is "0", the latitude and longitude of the center are "35.67160100466009" and "139.74065636676073", respectively, and the radius is "50" meters is correlated with geofences of the point names "1", "2", "3", and "4" included in a prescribed range of "~200 m" from the geofence, geofences of the point names "5", "6", "7", "8", "9", and "A" included in a prescribed range of "200 m~ 500 m" from the geofence, and geofences of the point names "B", "C", "D", "E", "F", "G", "H", and "1" included in a prescribed range of "500 m~1 km" from the geofence. The related geofence information may include a portion of the point name, Lat, Lon, the radius, and the prescribed range and may include another information in correlation. The prescribed range may be set in advance by an administrator or the like of the check-in determination apparatus 1.

Figure 7:
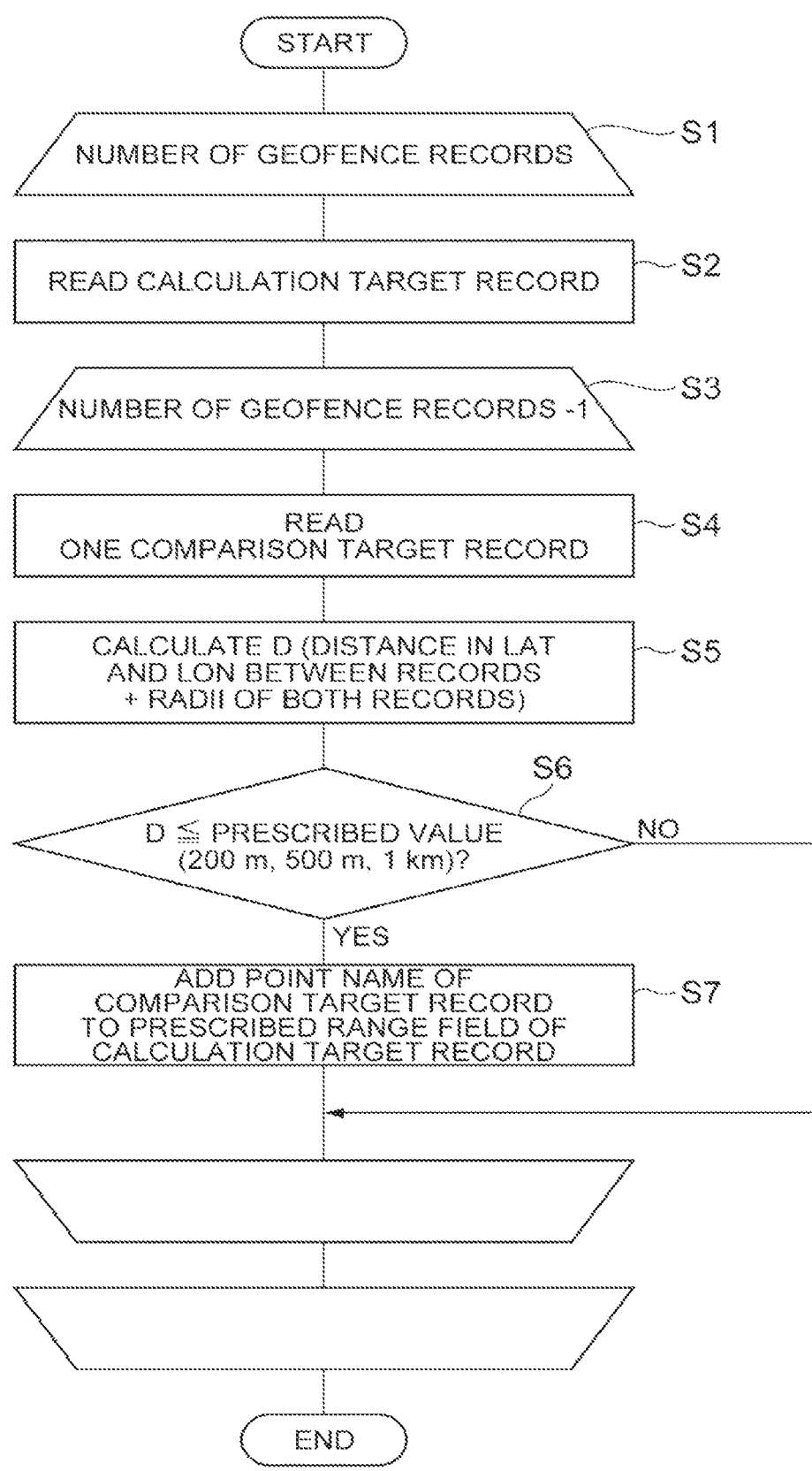
FIG. 7 is a flowchart illustrating an example of a related geofence information creation process.

FIG. 7 is a flowchart illustrating an example of a related geofence information creation process of the related geofence information creation unit 11. First, a loop process (S1 loop) of reading the geofence information stored in the geofence information storage unit 10 and performing the subsequent processes of S2 to S7 repeatedly with respect to the respective records is executed (step S1). In the S1 loop, first, a calculation target record which is a target record of this loop is read from the geofence information read in step S1 (step S2). Moreover, in step S2, the record (point name, Lat, Lon, and radius) of a geofence indicated by the calculation target record among the pieces of geofence information read in step S1 is set as a new record of the related geofence information to be created.

Subsequently, a loop process (S3 loop) of performing the subsequent processes of S3 to S7 repeatedly with respect to each record other than the calculation target record among the pieces of geofence information read in step S1 is executed (step S3). In the S3 loop, first, a comparison target record which is a target record of this loop is read from the pieces of geofence information (other than the calculation target record) read in step S1 (step S4). Subsequently, a value D (the distance in Lat and Lon between the calculation target record and the comparison target record+the radii of the calculation target record and the comparison target record) based on the distance between a geofence indicated by the calculation target record read in step S2 and a geofence indicated by the comparison target record read in step S4 is calculated (step S5).

Subsequently, it is determined whether the value D is equal to or smaller than a prescribed value of 200 m, 500 m, or 1 km (step S6). More specifically, it is determined whether the value D is equal to or larger than 0 m and equal to or smaller than the prescribed value of 200 in, or is larger than 200 m and equal to or smaller than the prescribed value of 500 m, or is larger than 500 m and equal to or smaller than the prescribed value of 1 km. When it is determined in step S6 that the value D is equal to or larger than 0 m and equal to or smaller than 200 m (S6: YES), a point name of the comparison target record is additionally correlated with a new record of the related geofence information set in step S2 as a point name of a geofence included in the prescribed range of "~200 m" (step S7). Similarly, when it is determined in step S6 that the value D is larger than 200 m and equal to or smaller than 500 m (S6: YES), a point name of the comparison target record is additionally correlated with a new record of the related geofence information set in step S2 as a point name of a geofence included in the prescribed range of "200 m~ 500 m" (step S7). Similarly, when it is determined in step S6 that the value D is larger than 500 m and equal to or smaller than 1 km (S6: YES), a point name of the comparison target record is additionally correlated with a new record of the related geofence information set in step S2 as a point name of a geofence included in the prescribed range of "500 m~1 km" (step S7).

Subsequently to step S7 or when it is determined in step S6 that the value D is larger than the prescribed value of 1 km (S6: NO), the S3 loop proceeds to a subsequent loop (the S3 loop is executed with respect to a subsequent comparison target record). After all loops in the S3 loop are completed (after the S3 loop is executed with respect to all comparison target records), the S1 loop proceeds to a subsequent loop (the S1 loop is executed with respect to a subsequent calculation target record). After all loops in the S1 loop are completed (after the S1 loop is executed with respect to all calculation target records), the related geofence information creation process ends.

The creation of the related geofence information by the related geofence information creation unit 11 may be executed periodically (for example, once a day) and may be executed irregularly on the basis of an instruction of an administrator or the like of the check-in determination apparatus 1. The creation of the related geofence information by the related geofence information creation unit 11 is executed independently from and earlier than the determination of check-in by the check-in determination apparatus 1 (the check-in determination unit 15 thereof). That is, a processing time of the determination of check-in by the check-in determination apparatus 1 (the check-in determination unit 15 thereof) is not influenced by a processing time of the creation of the related geofence information by the related geofence information creation unit 11. The creation of the related geofence information by the related geofence information creation unit 11 may be executed at the timing of the determination of check-in by the check-in determination apparatus 1 (the check-in determination unit 15 thereof).

The related geofence information storage unit 12 stores related geofence information. Specifically, the related geofence information storage unit 12 stores the related geofence information created by the related geofence information creation unit 11.

The determination history information storage unit 13 stores determination history information of each terminal 2, in which the position identifying information of the terminal 2 when check-in of the terminal 2 with respect to a geofence is determined and geofence identifying information capable of identifying the geofence are correlated. Specifically, the determination history information storage unit 13 stores the determination history information created by the determination history information creation unit 16 to be described later. Although the geofence identifying information may be a point name, for example, there is no limitation thereto, and arbitrary information may be used as long as it can identify a geofence.

FIG. 8 is a diagram illustrating an example of a determination history information table. As illustrated in FIG. 8, determination history information is correlated with UUID which is identification information of the terminal 2 when check-in of the terminal 2 with respect to a geofence is determined, Lat of the position identifying information of the terminal 2, Lon of the position identifying information of the terminal, datetime indicating the timing (the timing at which the terminal 2 has checked into the geofence) at which the position identifying information of the terminal 2 was acquired, and a point name (geofence identifying information) of the geofence. For example, the first record of the example of the determination history information table illustrated in FIG. 8 indicates that the terminal 2 having the UUID of "123456" has checked into a geofence of which the point name is "0" when the latitude and longitude as the position of the terminal 2 were "35.67133587740171" and "139.74037219385116", respectively, at the datetime of "2018-08-22 13:40-00". The determination history information may store all histories of the past check-in of each of the terminals 2 (UUIDs), may store the history of a prescribed period (for example, past one week), and may store the history of an immediately previous check-in. The determination history information may include a portion of UUID, Lat, Lon, datetime, and point name, and may include other information in correlation.

The position identifying information acquisition unit 14 acquires the position identifying information of the terminal 2. Specifically, the position identifying information acquisition unit 14 receives and acquires the position identifying information transmitted from the respective terminals 2. The position identifying information acquisition unit 14 may acquire the position identifying information (indirectly) from other apparatus or the memory or the like of the check-in determination apparatus 1 without being limited to the terminals 2. The position identifying information acquisition unit 14 outputs the acquired position identifying information to the check-in determination unit 15.

The check-in determination unit 15 determines check-in of the terminal 2 with respect to a target geofence which is a geofence determined on the basis of the position identifying information of the terminal 2 acquired (input) by the position identifying information acquisition unit 14, the determination history information stored by the determination history information storage unit 13, and the related geofence information stored by the related geofence information storage unit 12. The check-in determination unit 15 may calculate a moving distance of the terminal 2 on the basis of the position identifying information of the terminal 2 acquired by the position identifying information acquisition unit 14 and the position identifying information included in the determination history information of the terminal 2 stored by the determination history information storage unit 13 and may determine the target geofence further on the basis of the calculated moving distance. The check-in determination unit 15 may determine another geofence correlated in the related geofence information stored by the related geofence information storage unit 12 as the target geofence. The check-in determination unit 15 may calculate a moving distance of the terminal 2 on the basis of the position identifying information of the terminal 2 acquired by the position identifying information acquisition unit 14 and the position identifying information included in the determination history information of the terminal 2 stored by the determination history information storage unit 13, and may determine another geofence correlated, on the basis of the calculated moving distance, with a geofence identified by the geofence identifying information correlated with the position identifying information included in the determination history information in the related geofence information stored by the related geofence information storage unit 12 as a target geofence. The check-in determination unit 15 may determine whether the determination history information of the terminal 2 is stored by the determination history information storage unit 13 when the position identifying information of the terminal 2 is acquired by the position identifying information acquisition unit 14 and may determine the target geofence when it is determined that the information is stored. The details of the above-described process of the check-in determination unit 15 will be described later.

After determining check-in of the terminal 2, the check-in determination unit 15 may transmit the determination result or information based on the determination result to the terminal 2, another function of the check-in determination apparatus 1, or another apparatus. The determination result may include the UUID of the terminal 2, the point name of the geofence for which check-in was determined, and datetime which is the timing at which the position identifying information of the terminal 2 which is a check-in determination target was acquired and may include other information.

The determination history information creation unit 16 creates determination history information in which the position identifying information of the terminal 2 acquired by the position identifying information acquisition unit 14 and the geofence identifying information capable of identifying the geofence when check-in of the terminal 2 with respect to the geofence was determined by the check-in determination unit 15 are correlated.

Figure 9:
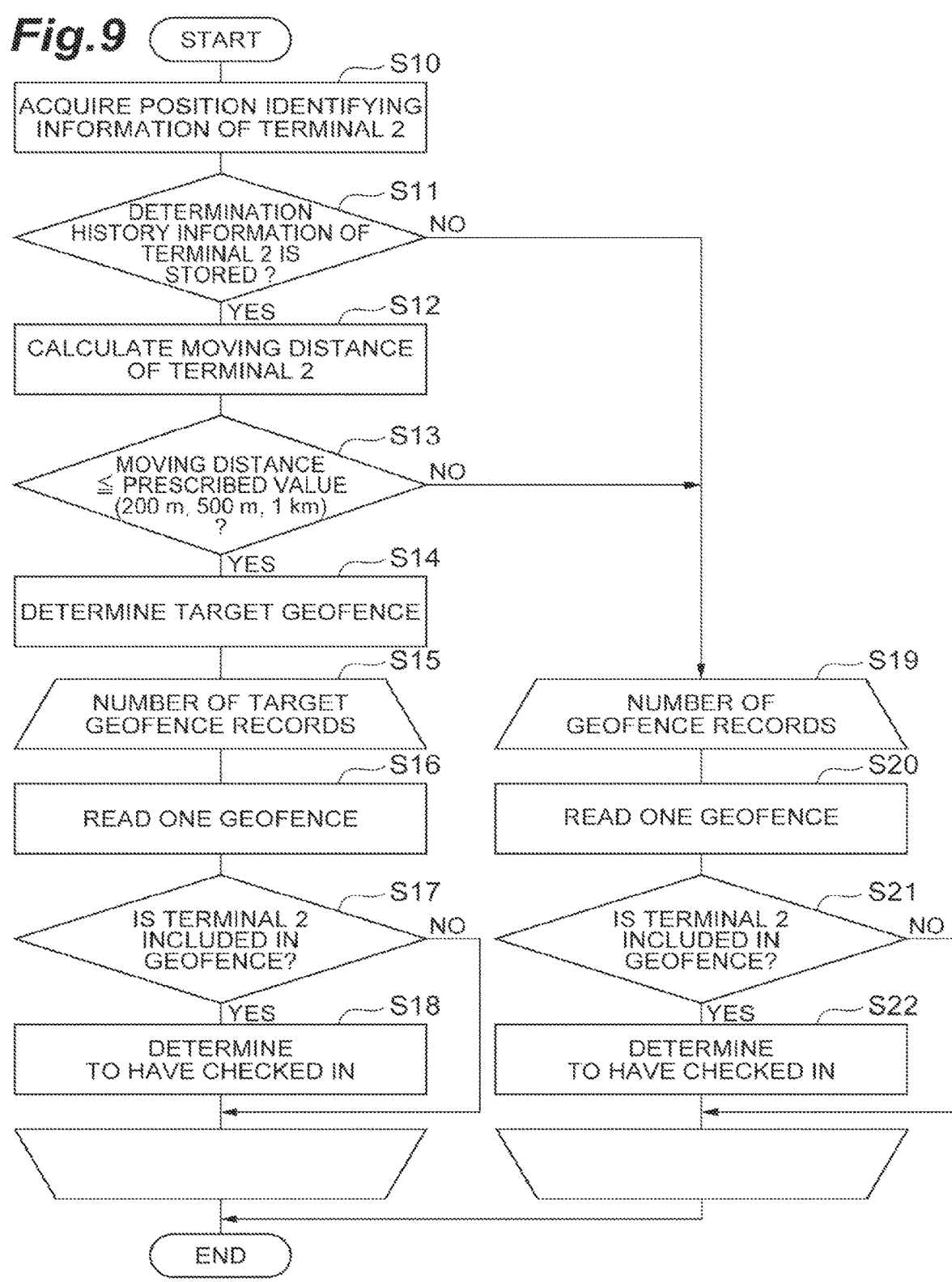
FIG. 9 is a flowchart illustrating an example of a check-in determination process.

A processing example of the check-in determination unit 15 and the determination history information creation unit 16 will be described with reference to FIG. 9. FIG. 9 is a flowchart illustrating an example of a check-in determination process by the check-in determination unit 15 and the determination history information creation unit 16. The subject of the process is the check-in determination unit 15 unless particularly stated otherwise in the following description.

First, the position identifying information acquisition unit 14 acquires the position identifying information of the terminal 2 (step S10). It is assumed that the position identifying information includes a UUID, Lat, Lon, and datetime. Subsequently, it is determined whether the determination history information of the terminal 2 is stored by the determination history information storage unit 13 (that is, whether a previous check-in history of the terminal 2 is present) (step S11). More specifically, the UUID of the terminal 2 included in the position identifying information acquired in step S10 is extracted, and it is determined whether a record corresponding to the extracted UUID is present in the determination history information stored by the determination history information storage unit 13. When it is determined in step S11 that the information is stored (S11: Yes), a moving distance from the position during the previous check-in of the terminal 2 to the present position of the terminal 2 is calculated (step S12). More specifically, the distance between the position indicated by the Lat and Lon of a record (hereinafter referred to as a "previous check-in record") of which the datetime is the latest among the pieces of determination history information of the terminal 2 stored by the determination history information storage unit 13 and the position indicated by the Lat and Lon included in the position identifying information acquired in step S10 is calculated.

Subsequently, it is determined whether the moving distance calculated in step S12 is equal to or smaller than the prescribed value of 200 m, 500 m, or 1 km (step S13). More specifically, it is determined whether the moving distance is equal to or larger than 0 m and equal to or smaller than the prescribed value of 200 m, or is equal to or larger than 200 m and equal to or smaller than the prescribed value of 500 m, or is equal to or larger than 500 m and equal to or smaller than the prescribed value of 1 km.

When it is determined in step S12 that the moving distance is equal to or larger than 0 m and equal to or smaller than the prescribed value of 200 m (S13: YES), a geofence indicated by a point name included in the prescribed range of "~200 m" of the record of which the point name is the point name of the previous check-in record among the pieces of related geofence information stored by the related geofence information storage unit 12 is determined as the target geofence (step S14). For example, when the related geofence information is the table example illustrated in FIG. 6 and the previous check-in record is the first record of the table example illustrated in FIG. 8, the geofences indicated by the point names of "1", "2", "3", and "4" are determined as the target geofences.

Similarly, when it is determined in step S12 that the moving distance is equal to or larger than 200 m and equal to or smaller than the prescribed value of 500 m (S13: YES), a geofence indicated by a point name included in the prescribed range of "200 m 500 in" of the record of which the point name is the point name of the previous check-in record among the pieces of related geofence information stored by the related geofence information storage unit 12 is determined as the target geofence (step S14). For example, when the related geofence information is the table example illustrated in FIG. 6 and the previous check-in record is the first record of the table example illustrated in FIG. 8, the geofences indicated by the point names of "5", "6", "7", "8", "9", and "A" are determined as the target geofences.

Similarly, when it is determined in step S12 that the moving distance is equal to or larger than 500 m and equal to or smaller than the prescribed value of 1 km (S13: YES), a geofence indicated by a point name included in the prescribed range of "500 m~1 km" of the record of which the point name is the point name of the previous check-in record among the pieces of related geofence information stored by the related geofence information storage unit 12 is determined as the target geofence (step S14). For example, when the related geofence information is the table example illustrated in FIG. 6 and the previous check-in record is the first record of the table example illustrated in FIG. 8, the geofences indicated by the point names of "B", "C", "D", "E", "F", "G", "H", and "I" are determined as the target geofences.

Subsequently to step S14, a loop process (S15 loop) of extracting the records of the target geofences determined in step S14 from the pieces of geofence information stored by the geofence information storage unit 10 and performing the subsequent processes of steps S16 to S18 repeatedly with respect to the respective records is executed (step S15). In the S15 loop, first, a determination target record (geofence) which is a target record of this loop is read (step S16). Subsequently, it is determined whether the terminal 2 has checked into a geofence indicated by the determination target record read in step S16 (step S17). More specifically, it is determined whether the position indicated by the Lat and Lon included in the position identifying information acquired in step S10 is included in a circle of which the radius is the radius of the determination target record about the position indicated by the Lat and Lon of the determination target record. When it is determined in step S17 that the terminal 2 has checked in (S17: YES), it is determined that the terminal 2 has checked in (step S18) and the determination history information creation unit 16 creates determination history information in which the position identifying information acquired in step S10 is correlated with the point name of the determination target record.

Subsequently to step S18 or when it is determined in step S17 that the terminal 2 has not checked in (step S17: NO), the S15 loop proceeds to a subsequent loop (the S15 loop is executed with respect to the subsequent determination target record among the records of the target geofences). After all loops of the S15 loop are completed (after the S15 loop is executed with respect to all determination target records), the check-in determination process ends.

When it is determined in step S11 that the information is not stored (S11: NO), or when it is determined in step S13 that the moving distance is larger than the prescribed value 1 km (S13: NO), a loop process (S19 loop) of extracting all records of the geofence information stored by the geofence information storage unit 10 and performing the subsequent processes of S20 to S22 repeatedly with respect to the respective records is executed (step S19). In the S19 loop, first, a determination target record (geofence) which is a target record of this loop is read (step S20). Subsequently, it is determined whether the terminal 2 has checked into the geofence indicated by the determination target record read in step S20 (step S21). More specifically, it is determined whether the position indicated by the Lat and Lon included in the position identifying information acquired in step S10 is included in a circle of which the radius is the radius of the determination target record about the position indicated by the Lat and Lon of the determination target record. When it is determined in step S21 that the terminal 2 has checked in (S21: YES), it is determined that the terminal 2 has checked in (step S22) and the determination history information creation unit 16 creates determination history information in which the position identifying information acquired in step S10 is correlated with the point name of the determination target record.

Subsequently to step S22 or when it is determined in step S21 that the terminal 2 has not checked in (step S21: NO), the S19 loop proceeds to a subsequent loop (the S19 loop is executed with respect to the subsequent determination target record among all the records of the target geofences). After all loops of the S19 loop are completed (after the S19 loop is executed with respect to all determination target records), the check-in determination process ends. The S19 loop is a so-called full search. In description of step S19, it has been described that all records of the geofence information stored by the geofence information storage unit 10 are extracted and the subsequent processes of steps S20 to S22 are performed repeatedly with respect to the respective records. However, instead of extracting all records, the records related to geofences other than the geofences indicated by the point names included in the prescribed ranges of "~200 m", "200 m~500 m", and "500 m to 1 km" may be extracted, and the subsequent processes of steps S20 to S22 may be performed repeatedly with respect to the respective records.

In description of the check-in determination process, although it has been described that the previous check-in record which is the record during the previous check-in is used, there is no limitation thereto. For example, the process may be performed using the record during the n-th previous check-in (n is an integer of 1 or more). Moreover, although "200 m", "500 m", and "1 km" are used for the prescribed values and the prescribed ranges in the present embodiment, there is no limitation thereto and arbitrary values may be used. The values "200 m", "500 m", and "1 km" are values set assuming that the position identifying information acquisition unit 14 acquires the position identifying information of the terminal 2 once in three minutes and the walking speed of the user carrying the terminal 2 is 70 meters per minute. In this manner, the check-in determination apparatus 1 or the administrator thereof may set the prescribed value and the prescribed range on the basis of the acquisition frequency of the position identifying information acquisition unit 14 and the moving speed of the terminal 2.

Next, the effects of the check-in determination apparatus 1 configured as in the present embodiment will be described.

According to the check-in determination apparatus 1 of the present embodiment, the check-in determination unit 15 determines check-in of the terminal 2 with respect to a target geofence determined on the basis of the position identifying information of the terminal 2 acquired by the position identifying information acquisition unit 14, the determination history information stored by the determination history information storage unit 13, and the related geofence information stored by the related geofence information storage unit 12. In this way, for example, since narrowed-down geofences are determined as the target geofence and the number of target geofences for which check-in of the terminal 2 is determined decreases, it is possible to determine check-in at a higher speed.

According to the check-in determination apparatus 1 of the present embodiment, the check-in determination unit 15 calculates the moving distance of the terminal 2 on the basis of the position identifying information of the terminal 2 acquired by the position identifying information acquisition unit 14 and the position identifying information included in the determination history information of the terminal 2 stored by the determination history information storage unit 13 and the target geofence is calculated further on the basis of the calculated moving distance. In this way, it is possible to determine a target geofence in which the terminal 2 is highly likely to check in on the basis of the moving distance of the terminal 2, for example. Therefore, since determinations of check-in with respect to a geofence in which the terminal 2 is less likely to check in (that is, unnecessary determination of check-in) are reduced, it is possible to determine check-in at a higher speed.

According to the check-in determination apparatus 1 of the present embodiment, the check-in determination unit 15 determines a geofence (another geofence) included in the prescribed range correlated in the related geofence information stored by the related geofence information storage unit 12 as a target geofence. In this way, it is possible to determine a geofence corresponding to the distance from a geofence in which the terminal 2 has checked in previously as a target geofence, for example. That is, it is possible to determine a target geofence in which the terminal 2 is highly likely to check in. Therefore, since determinations of check-in with respect to a geofence in which the terminal 2 is less likely to check in (that is, unnecessary determination of check-in) are reduced, it is possible to determine check-in at a higher speed.

According to the check-in determination apparatus 1 of the present embodiment, the check-in determination unit 15 calculates the moving distance of the terminal 2 on the basis of the position identifying information of the terminal 2 acquired by the position identifying information acquisition unit 14 and the position identifying information included in the determination history information of the terminal 2 stored by the determination history information storage unit 13 and determines another geofence correlated, on the basis of the calculated moving distance, with the geofence identified by the geofence identifying information correlated with the position identifying information included in the determination history information in the related geofence information stored by the related geofence information storage unit 12 as the target geofence. In this way, it is possible to determine a geofence corresponding to the moving distance of the terminal 2 from a geofence in which the terminal 2 has checked in previously as a target geofence, for example. That is, it is possible to determine a target geofence in which the terminal 2 is highly likely to check in. Therefore, since determinations of check-in with respect to a geofence in which the terminal 2 is less likely to check in (that is, unnecessary determination of check-in) are reduced, it is possible to determine check-in at a higher speed.

According to the check-in determination apparatus 1 of the present embodiment, the check-in determination unit 15 determines whether the determination history information of the terminal 2 is stored by the determination history information storage unit 13 (S11 in FIG. 9) when the position identifying information of the terminal 2 is acquired by the position identifying information acquisition unit 14 and determines the target geofence when it is determined that the information is stored. In this way, since it is possible to determine whether check-in determination based on a target geofence will be performed in an early stage, for example, it is possible to determine check-in reliably at a higher speed.

The check-in determination apparatus 1 of the present embodiment includes the related geofence information creation unit 11 that creates the related geofence information, and the related geofence information created by the related geofence information creation unit 11 is stored by the related geofence information storage unit 12. In this way, it is possible to create and store the related geofence information more reliably at an arbitrary timing, for example.

The check-in determination apparatus 1 of the present embodiment includes the determination history information creation unit 16 that creates determination history information that correlates the position identifying information of the terminal 2 acquired by the position identifying information acquisition unit 14 with the geofence identifying information of the geofence when the check-in determination unit 15 determines check-in of the terminal 2 with respect to the geofence, and the determination history information created by the determination history information creation unit 16 is stored by the determination history information storage unit 13. In this way, it is possible to create and store the determination history information more reliably at a timing at which check-in is determined, for example.

Here, an apparatus (a conventional apparatus) that determines check-in in the conventional technique will be described. The conventional apparatus performs the following comparison and determines that a terminal has checked in when a condition is satisfied. For example, when the Lat and Lon of a terminal are input, the distance to the position indicated by the Lat and Lon of each record related to a geofence in a DB is calculated and it is compared whether the calculated distance is equal to or smaller than the radius of the geofence. Moreover, for example, when the SSID or BSSID related to network communication of a terminal are input, it is compared whether the input SSID or BSSID match the SSID or BSSID of each record related to the geofence in a DB. In this manner, the computation amount in the conventional apparatus corresponds a multiplication of the number of records in the DB by the number of pieces of input data, and full search is performed (since a terminal may check into a plurality of geofences, determination is performed for all records in the DB). That is, the conventional apparatus incurs a huge amount of computation and it takes a considerable amount of time in determining check-in of a terminal.

On the other hand, as described above, in the check-in determination apparatus 1 of the present embodiment, the check-in determination is accelerated by limiting table search to a moving range of the terminal 2. More specifically, the check-in determination apparatus 1 calculates the moving distance of the terminal 2 of the user from previous position information and present position information and performs check-in determination for geofences included in that range. Moreover, the check-in determination apparatus 1 defines a prescribed range in advance, performs an operation of extracting geofences included in the definition, constructs related geofence information, and narrows down determination target geofences while observing the moving distance and the previous check-in during check-in determination. In this way, the check-in determination apparatus 1 can determine check-in at a higher speed.

The block diagram used in description of the embodiment illustrates functional blocks. These functional blocks (configuration units) are realized by an arbitrary combination of hardware and/or software. Moreover, a realization method for realizing the respective functional blocks is not particularly limited. That is, the respective functional blocks may be realized by one apparatus which is physically or logically coupled or may be realized by a plurality of apparatuses which are physically or logically separated and which are directly and/or indirectly (for example, by cables and/or wirelessly) connected. The functional blocks may be realized by combining software with one apparatus or a plurality of apparatuses.

Examples of functions include determining, deciding, judging, calculating, computing, processing, deriving, investigating, searching, ascertaining, receiving, transmitting, outputting, accessing, resolving, selecting, choosing, establishing, comparing, assuming, expecting, considering, broadcasting, notifying, communication, forwarding, configuring, reconfiguring, allocating (mapping), assigning, and the like, but there is no limitation thereto. For example, a functional block (configuration unit) for performing transmission may be referred to as a transmitting unit or a transmitter. As described above, a realization method thereof is not particularly limited.

Figure 10:
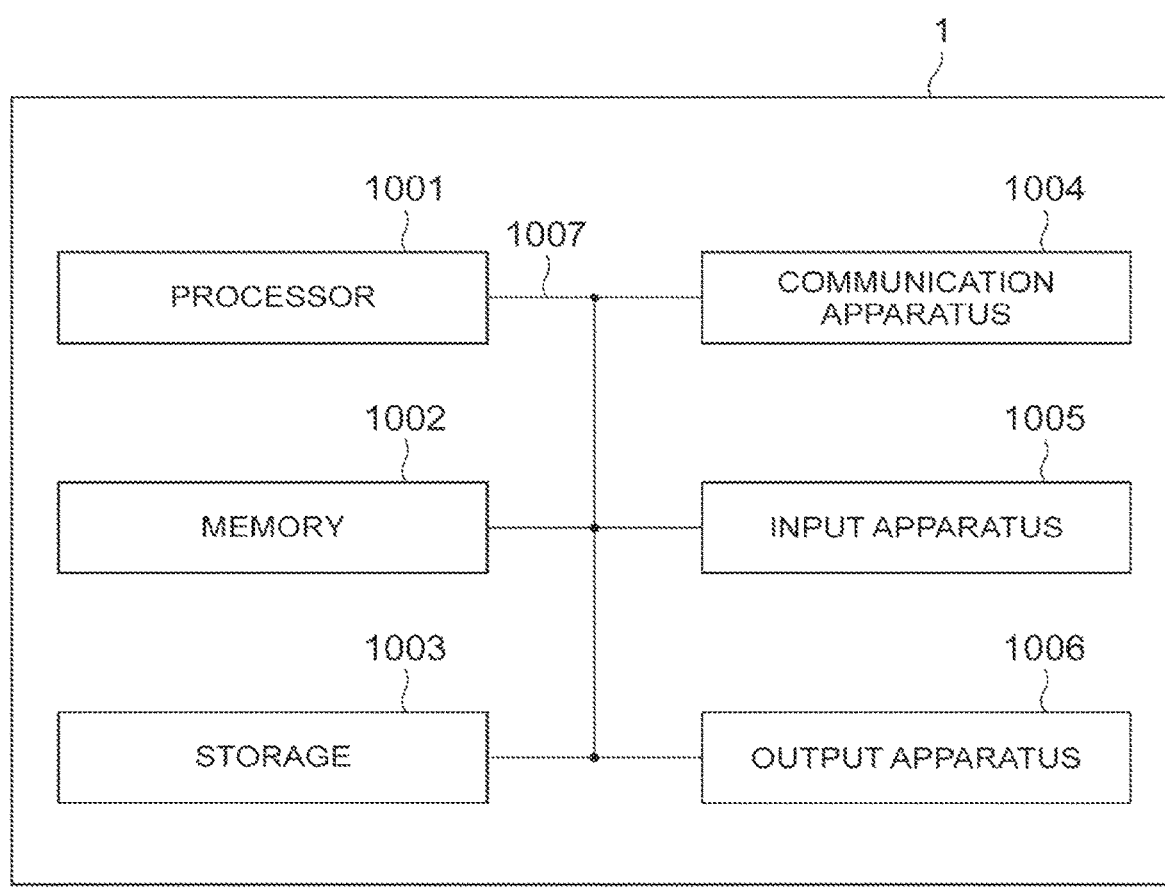
FIG. 10 is a diagram of a hardware configuration of the check-in determination apparatus according to the embodiment of the present invention.

For example, the check-in determination apparatus 1 and the like according to an embodiment of the present invention may function as a computer that performs a check-in determination process of the present disclosure. FIG. 10 is a diagram illustrating an example of a hardware configuration of the check-in determination apparatus 1 according to the present embodiment. The check-in determination apparatus 1 may be physically configured as a computer apparatus which includes a processor 1001, a memory 1002, a storage 1003, a communication apparatus 1004, an input apparatus 1005, an output apparatus 1006, a bus 1007, and the like.

In the following description, the word "apparatus" may be replaced with "circuit," "device," "unit," or the like. The hardware configuration of the check-in determination apparatus 1 may include one or a plurality of apparatuses illustrated in FIG. 10 and may not include some apparatuses.

The respective functions of the check-in determination apparatus 1 are realized when predetermined software (program) is read onto hardware such as the processor 1001, the memory 1002, and the like, the processor 1001 performs an operation, and the communication by the communication apparatus 1004 and the data read and/or written in the memory 1002 and the storage 1003 are controlled.

The processor 1001 operates an operating system to control the entire computer, for example. The processor 1001 may be configured as a central processing unit (CPU) that includes an interface to a peripheral apparatus, a control apparatus, an operation apparatus, a register, and the like. For example, the related geofence information creation unit 11, the position identifying information acquisition unit 14, the check-in determination unit 15, the determination history information creation unit 16, and the like may be realized by the processor 1001.

The processor 1001 reads a program (program codes), a software module, or data from the storage 1003 and/or the communication apparatus 1004 into the memory 1002 and executes various processes according to the program and the like. A program for causing a computer to execute at least a portion of the operations described in the embodiment is used as the program. For example, the related geofence information creation unit 11, the position identifying information acquisition unit 14, the check-in determination unit 15, and the determination history information creation unit 16 may be realized by a control program which is stored in the memory 1002 and operated by the processor 1001, and the other functional blocks may be realized in the same way. Although it has been described that the above-described processes are executed by one processor 1001, the processes may be executed by two or more processors 1001 simultaneously or sequentially. One or more chips may be mounted in the processor 1001. The program may be transmitted from a network via a telecommunication circuit.

The memory 1002 is a computer-readable recording medium and may be configured as at least one of a read only memory (ROM), an erasable programmable ROM (EPROM), an electrically erasable programmable ROM (EEPROM), a random access memory (RAM), and the like, for example. The memory 1002 may be referred to as a register, a cache, a main memory (main storage device), and the like. The memory 1002 can store a program (program codes), a software module, and the like that can be executed to perform a wireless communication method according to an embodiment of the present invention.

The storage 1003 is a computer-readable recording medium and may be configured as at least one of an optical disc such as a compact disc (CD)-ROM, a hard disk drive, a flexible disk, an optomagnetic disc (for example, a compact disc, a digital versatile disc, or a Blu-ray (registered trademark) disc), a smartcard, a flash memory (for example, a card, a stick, or a key drive), a floppy (registered trademark) disk, a magnetic strip, and the like, for example. The storage 1003 may be referred to as an auxiliary storage apparatus. The above-described storage medium may be a database and a server, and any other appropriate medium that include the memory 1002 and/or the storage 1003.

The communication apparatus 1004 is hardware (a transmission and reception apparatus) for performing communication between computers via cables and/or a wireless network and is also referred to as a network device, a network controller, a network card, a communication module, and the like, for example. The communication apparatus 1004 may include a high-frequency switch, a duplexer, a filter, a frequency synthesizer, and the like in order to realize at least one of frequency division duplex (FDD) and time division duplex (TDD), for example. For example, the position identifying information acquisition unit 14, the check-in determination unit 15, and the like may be realized by the communication apparatus 1004.

The input apparatus 1005 is an input device (for example, a keyboard, a mouse, a microphone, a switch, a button, a sensor, and the like) that receives the input from the outside. The output apparatus 1006 is an output device (for example, a display, a speaker, an LED lamp, or the like) that outputs information to the outside. The input apparatus 1005 and the output apparatus 1006 may have an integrated configuration (for example, a touch panel).

The respective apparatuses such as the processor 1001 and the memory 1002 are connected by the bus 1007 for communicating information. The bus 1007 may be configured as a single bus and may be configured as different buses for respective apparatuses.

The check-in determination apparatus 1 may be configured to include hardware such as a microprocessor, a digital signal processor (DSP), an application specific integrated circuit (ASIC), a programmable logic device (PLD), a field programmable gate array (FPGA), and the like, and some or all of the respective functional blocks may be realized by the hardware. For example, the processor 1001 may be implemented by at least one of these items of hardware.

Notification of information is not limited to the aspects and embodiments described in the present disclosure but may be performed using another method.

The respective aspects and embodiments described in the present disclosure may be applied to Long Term Evolution (LTE), LTE-Advanced (LTE-A), SUPER 3G, IMT-Advanced, 4th generation mobile communication system (4G), 5th generation mobile communication system (5G), Future Radio Access (FRA), new radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), a system which uses other appropriate systems, and/or a next-generation system which is extended on the basis of these systems. Moreover, the respective aspects and embodiments described in the present disclosure may be applied to combinations of a plurality of systems (a combination of at least one of LTE and LTE-A and 5G).

The orders in the processing procedures, the sequences, the flowcharts, and the like described in the respective aspects and embodiments described in the present disclosure may be switched unless contradiction occurs. For example, in the method described in the present disclosure, although various steps are illustrated in an exemplary order, the steps are not limited to the illustrated specific order.

Input and output information and the like may be stored in a specific location (for example, a memory) and may be managed by a management table. The input and output information and the like may be overwritten, updated, or rewritten. The output information and the like may be erased. The input information and the like may be transmitted to other apparatuses.

Determination may be made by a value (0 or 1) represented by one bit, may be made by a Boolean value (true or false), and may be made by comparison of numerical values (comparison with a predetermined value, for example).

The respective aspects and embodiments described in the present disclosure may be used solely, may be used in combination, and may be switched and used according to execution. Moreover, the notification (notification of "X," for example) of predetermined information is not limited to being performed explicitly but may be performed implicitly (for example, without performing the notification of the predetermined information).

While the present disclosure has been described above in detail using the embodiment, it is obvious to those skilled in the art that the present disclosure is not limited only to the embodiment described in the present disclosure. The present disclosure can also be embodied in other modified and altered forms without departing from the gist and scope of the present disclosure as defined by description in the appended claims. It is therefore to be understood that the disclosure of the present disclosure is intended for the purpose of description and exemplification but is not intended to limit the scope of the present disclosure.

The software should be widely interpreted to mean an instruction, an instruction set, a code, a code segment, a program code, a program, a subprogram, a software module, an application, a software application, a software package, a routine, a subroutine, an object, an executable file, an execution thread, a procedure, a function, and the like, regardless of whether the software is referred to as software, firmware, middleware, microcode, hardware description language or other names.

Furthermore, software, instructions, information, and the like, may be transmitted and received via a transmission medium. For example, when the software is transmitted from a website, server, or another remote source using wired technology such as coaxial cable, fiber optic cable, twisted pair and digital subscriber line (DSL) and/or wireless technology such as infrared rays, radio, and microwave, these wired and/or wireless technologies are included within the definition of the transmission medium.

Information, signals, and the like described in the present disclosure may be represented using any of various other techniques. For example, data, instructions, commands, information, signals, bits, symbols, chips, and the like mentioned in the entire description may be represented by voltage, current, electromagnetic waves, magnetic field or magnetic particles, optical field or photons, or any combination thereof.

The terms described in the present disclosure and/or the terms necessary for understanding of the present disclosure may be replaced with terms having the same or similar meaning.

The terms "system" and "network" as used in the present disclosure are used interchangeably.

Furthermore, the information, parameters, and the like described in the present disclosure may be represented by absolute values, may be represented as relative values from predetermined values, or may be represented by any other corresponding information.

The names used for the above-described parameters are not limiting names in any respect. Furthermore, numerical formulae using these parameters may be different from those explicitly disclosed in the present disclosure.

In the present disclosure, the terms "mobile station (MS)", "user terminal", user equipment (UE)", and "terminal" can be used interchangeably.

The terms "determine (determining)" and "decide (determining)" used in the present disclosure may include various types of operations. For example, "determining" and "deciding" may include considering that a result of judging, calculating, computing, processing, deriving, investigating, looking up (search or inquiry) (for example, search in a table, a database, or another data structure), or ascertaining is "determined" or "decided". Furthermore, "determining" and "deciding" may include, for example, considering that a result of receiving (for example, reception of information), transmitting (for example, transmission of information), inputting, outputting, or accessing (for example, accessing data in memory) is "determined" or "decided". Furthermore, "determining" and "deciding" may include considering that a result of resolving, selecting, choosing, establishing, or comparing is "determined" or "decided". That is, "determining" and "deciding" may include considering that a certain operation is "determined" or "decided". Moreover, "determining (deciding)" may be replaced with "assuming," "expecting," "considering," and the like.

The terms "connected" and "coupled," or any variation of these terms mean all direct or indirect connections or coupling between two or more elements, and may include the presence of one or more intermediate elements between two elements that are "connected" or "coupled" to each other. The coupling or connection between the elements may be physical, logical or a combination of these. For example, "connection" may be replaced with "access". As used in the present disclosure, when two elements are connected, these elements may be considered "connected" or "coupled" to each other by using one or more electrical wires, cables and/or printed electrical connections, and, as a number of non-limiting and non-inclusive examples, by using electromagnetic energy, such as electromagnetic energy having wavelengths in the radio frequency, microwave and optical (both visible and invisible) regions.

The expression "on the basis of" used in the present disclosure does not mean "on the basis of only" unless particularly stated otherwise. In other words, the expression "on the basis of" means both "on the basis of only" and "on the basis of at least".

In the configurations of the respective apparatuses, "means" may be replaced with "unit", "circuit", "device", and the like.

As long as "include," "including," and variations thereof are used in the present disclosure or the claims, these terms are intended to be inclusive in a manner similar to the expression "comprising". Furthermore, the expression "or" used in the specification or claims is not intended to mean an exclusive logical sum.

In the present disclosure, when English articles such as a, an, and the are added to an element in the translated English text, for example, such an element to which these articles are added may be provided plurally.

In the present disclosure, the phrase "A and B are different" may mean "A and B are different from each other". The phrase may mean "A and B each are different from C". The terms such as "separate" "coupled" and the like may be interpreted similarly as "different".

REFERENCE SIGNS LIST

1: Check-in determination apparatus
2: Terminal
3: Check-in determination system
10: Geofence information storage unit
11: Related geofence information creation unit
12: Related geofence information storage unit
13: Determination history information storage unit
14: Position identifying information acquisition unit
15: Check-in determination unit
16: Determination history information creation unit

The invention claimed is:

1. A check-in determination apparatus configured to determine check-in indicating that a terminal has entered a geofence which is a prescribed geographic area, comprising processing circuitry configured to:
store determination history information for each terminal, in which position identifying information capable of identifying a position of the terminal when check-in of the terminal with respect to the geofence was determined is correlated with geofence identifying information capable of identifying the geofence;
store related geofence information that correlates another geofence with each geofence in advance, independent of the position of the terminal, on the basis of the other geofence being within a predetermined radius of a circular area surrounding the geofence, such that a plurality of correlations of geofences are stored in advance based on different distance ranges from a center of the circular area surrounding an originating geofence;
acquire position identifying information of the terminal; and
determine check-in of the terminal with respect to a target geofence which is the geofence determined on the basis of the acquired position identifying information of the terminal, the stored determination history information, and the stored related geofence information,
wherein
the processing circuitry calculates a moving distance of the terminal on the basis of the acquired position identifying information of the terminal and the position identifying information comprised in the stored determination history information of the terminal, and
the processing circuitry determines another geofence correlated, on the basis of the calculated moving distance falling within one of a plurality of different distance ranges, with the geofence identified by the geofence identifying information correlated with the position identifying information comprised in the determination history information in the stored related geofence information, as the target geofence.

2. The check-in determination apparatus according to claim 1, wherein
the processing circuitry determines whether the determination history information of the terminal has been stored when the position identifying information of the terminal was acquired and determines the target geofence when it is determined that the determination history information has been stored.

3. The check-in determination apparatus according to claim 1, wherein the processing circuitry further configured to:

create related geofence information, and store the created related geofence information.

4. The check-in determination apparatus according to claim 1, wherein the processing circuitry further configured to:

create determination history information in which the acquired position identifying information of the terminal is correlated with geofence identifying information capable of identifying the geofence when the processing circuitry determines check-in of the terminal with respect to the geofence, and store the created determination history information.

5. A method, implemented by processing circuitry of a check-in determination apparatus configured to determine check-in indicating that a terminal has entered a geofence which is a prescribed geographic area, the method comprising:

storing determination history information for each terminal, in which position identifying information capable of identifying a position of the terminal when check-in of the terminal with respect to the geofence was determined is correlated with geofence identifying information capable of identifying the geofence;

storing related geofence information that correlates another geofence with each geofence in advance, independent of the position of the terminal, on the basis of the other geofence being within a predetermined radius of a circular area surrounding the geofence, such that a plurality of correlations of geofences are stored in advance based on different distance ranges from a center of the circular area surrounding an originating geofence;

acquiring position identifying information of the terminal; and determining check-in of the terminal with respect to a target geofence which is the geofence determined on the basis of the acquired position identifying information of the terminal, the stored determination history information, and the stored related geofence information, wherein the method includes calculating a moving distance of the terminal on the basis of the acquired position identifying information of the terminal and the position identifying information comprised in the stored determination history information of the terminal, and determining another geofence correlated, on the basis of the calculated moving distance falling within one of a plurality of different distance ranges, with the geofence identified by the geofence identifying information correlated with the position identifying information comprised in the determination history information in the stored related geofence information, as the target geofence.

* * * * *